United States Patent [19]

Menti, Jr.

[11] 4,134,606
[45] Jan. 16, 1979

[54] WELD JOINT

[75] Inventor: Frank Menti, Jr., Maple Heights, Ohio

[73] Assignee: Parker-Hannifin Corporation, Cleveland, Ohio

[21] Appl. No.: 850,173

[22] Filed: Nov. 10, 1977

[51] Int. Cl.$^2$ ............................................. F16L 13/02
[52] U.S. Cl. ..................................... 285/21; 228/140; 228/191; 239/404; 285/286
[58] Field of Search ........................... 285/21, 22, 286; 228/191, 140, 189; 239/404; 151/14.5

[56] References Cited

U.S. PATENT DOCUMENTS

| | | | |
|---|---|---|---|
| 1,594,579 | 8/1926 | Timbs et al. ..................... | 228/189 X |
| 2,206,166 | 7/1940 | Dunn ................................. | 285/286 X |
| 3,709,529 | 1/1973 | Mains ................................. | 285/286 |

Primary Examiner—Thomas F. Callaghan
Attorney, Agent, or Firm—John N. Wolfram

[57] ABSTRACT

A welded joint between two telescoped and threaded together inner and outer parts of an assembly wherein the joint may be cut apart to permit unthreading of the one part from the other and for their subsequent reuse after repair or cleaning of the assembly. The inner part has an external thread and has a cylindrical portion between the external thread and the welded joint for expanding any inwardly projecting burr that may be formed on the outer part during the cutting operation so that the burr may pass over the external threads without damaging the same when the parts are unthreaded from each other. The invention is particularly adaptable for use with fuel injection nozzles but has use in other applications where welded together threaded parts are subject to disassembly and reuse.

8 Claims, 4 Drawing Figures

WELD JOINT

BACKGROUND OF THE INVENTION

Fuel injection nozzles for gas turbine engines, for safety reasons, must be made so as to eliminate any possibility of fuel leakage where housing or body parts are joined together. In addition, it is desirable that such parts have a threaded connection for clamping other nozzle parts therebetween. Such threaded and welded parts are well known in the fuel injection nozzle art. In many cases it is desirable to be able to disassemble the parts in order to clean or repair the nozzle and then reassemble and reweld the threaded parts. In such cases the weld joint should be designed so that it can be cut through by a tool and then rewelded. This poses a special problem because when the weld is cut through there may be formed a radially inwardly projecting burr on the internally threaded part which will pass over the external thread when the parts are unthreaded from each other. If the burr projects inwardly to or below the diameter of the external thread there is considerable risk that the burr will damage the thread upon separation of the parts.

One method of preventing thread damage in such nozzle parts is disclosed in Mains U.S. Pat. No. 3,709,529 wherein the diameter of the weld joint is substantially larger than the major diameter of the threads so that any radially inwardly projecting burr that is formed by cutting of the weld joint will still be large enough to pass over the external thread without damaging the same.

Another method of preventing damage to a thread upon separation of the nozzle parts after cutting through the weld joint is disclosed in Clemenshaw et al (U.S. Pat. No. 3,024,045). This patent discloses a ring of refractory material, such as carbon, between the end faces of the two threaded together parts. The weld metal is exterior of the refractory ring and the latter prevents formation of radially inward burrs to a diameter less than the diameter of the external thread when the joint is cut to thereby prevent damage to the external thread when the parts are separated.

The methods described in the above mentioned patents are satisfactory from a functional standpoint. However, space and cost limitations in some instances make it desirable that some other method or construction be used.

SUMMARY OF THE INVENTION

The present invention provides a welded joint between threaded together parts which may be disassembled without damage to the thread after cutting through the weld joint but wherein the latter is of a diameter only slightly larger than the major diameter of the external thread. This is accomplished by interposing a cylindrical portion on the inner externally threaded part between the thread and the weld joint that is slightly larger in diameter than the external thread.

In a preferred form of the invention there is also a groove on the inner part under the weld to permit the cutting tool to pass completely through the weld joint. If a burr is formed on the outer part by the cutting operation it will project into the groove and upon unthreading of the parts it will engage and be expanded radially outwardly by the cylindrical portion to a diameter slightly larger than the external thread so that it may pass thereover without damaging the same. The cylindrical portion will also displace radially outwardly any weld metal that has flowed radially inwardly during the welding operation to a diameter less than that of the cylindrical portion and thus likewise prevent it from damaging the thread upon separation of the parts.

DETAIL DESCRIPTION

Figure 1:
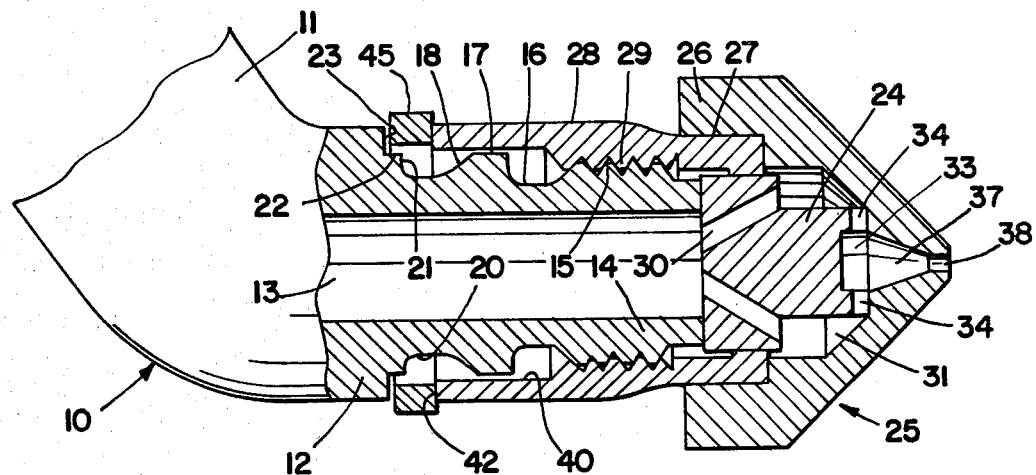
FIG. 1 is a fragmentary view, partly in cross section, of a fuel nozzle showing the joint before welding.

As shown in FIG. 1, a fuel injector nozzle 10 includes a holder 11 having a leg 12 with a passage 13 therethrough. Leg 12 toward its free end 14 has an external thread 15. Inwardly of thread 15 is a thread relief groove 16, a cylindrical portion or flange 17, a groove end wall 18 inclined at an angle of about 45°, a groove 20, a groove end wall 21, a cylindrical portion or land 22 and a transverse shoulder 23.

A spin plug 24 is clamped against the end face of leg 12 by a nozzle orifice assembly 25 that includes an orifice member 26 that has brazed to it at 27 an adaptor 28 that has an internal thread 29 engaged with external thread 15. Spin plug 24 has flow passages 30 that connect passage 13 with an annular chamber 31 and the latter connects with a spin chamber 33 by means of several circumferentially spaced tangential passages 34. Orifice member 26 contains a conical spin chamber 37 and an exit orifice 38.

Adaptor 28 has a bore 40 outwardly of internal thread 29 and of a diameter slightly larger (for example about 0.010" larger) than the major diameter of external thread 15. When orifice assembly 25 is threaded all the way onto leg 12 for clamping spin plug 24 against leg 12, the end face 42 of adaptor 28 will be axially spaced from groove end wall 21 and from shoulder 23, cylindrical portion or flange 17 will be within bore 40 with a slight clearance therebetween, and end face 42 will be radially opposite groove 20.

Before threading orifice assembly 25 onto leg 12, a ring 45 of weld metal is slipped over thread 15 and flange 17 onto cylindrical portion 22, the inside diameter of the weld ring being initially slightly larger than the diameter of flange 17 and cylindrical portion 22. Cylindrical portion 22 is either the same or slightly larger (as for example 0.010" larger) in diameter than flange 17.

Figure 2:
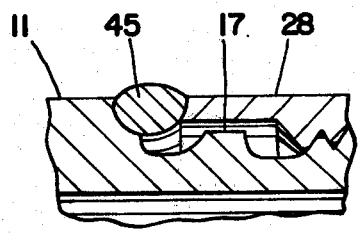
FIG. 2 is a fragmentary section view showing the joint after welding.

After the weld ring is fused to adaptor 28 and holder 11, the welded joint will generally appear as shown in FIG. 2.

Figure 3:
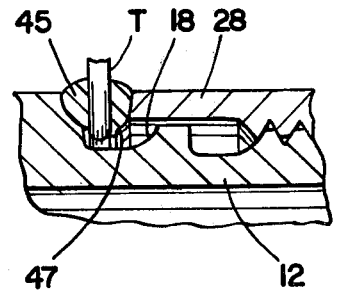
FIG. 3 is a fragmentary section view showing the welded joint after cutting through the weld.
Figure 4:
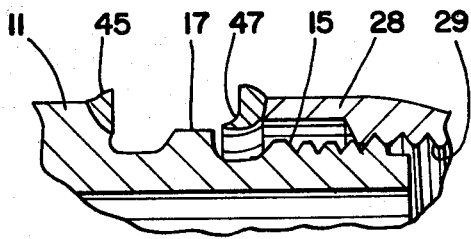
FIG. 4 is a fragmentary section view showing a burr expanded in diameter to permit disassembly of the parts without damage to the external threads.

When it is desired to remove orifice assembly 25 from holder 11, the weld metal 45 may be cut through by use of a tool T, as shown in FIG. 3. The tool may enter groove 20 when cutting all the way through the weld metal and may form a burr 47 whose inner diameter may be smaller than the diameter of flange 17 and the major diameter of external thread 15. Upon unthreading of orifice assembly 25 from leg 12, the burr will be engaged by inclined surface 18 and bent outwardly and expanded in diameter, as shown in FIG. 4, to at least the diameter of flange 17 so that it may pass over external thread 15 without damaging the same. The diameter of flange 17 is enough larger than thread 15 so that spring back of burr 47 to a smaller diameter after it passes over flange 17 will not result in its diameter becoming smaller than the major diameter of external thread 15. The flange will also be effective in preventing metal chips or other foreign matter from the cut joint from entering the threads and causing damage during separation of the parts.

After disassembly of the nozzle parts and repair or cleaning of the same, the old weld metal may be removed, a new weld ring assembled over leg 12, spin plug 24 and orifice assembly 25 reassembled to the holder, and the joint rewelded.

With the weld joint as just described, its diameter may be appreciably smaller with relation to the threaded portion of the joint than in previous arrangements and hence the nozzle or other device on which it is employed will occupy less space, use less material, and will be less costly. The invention may, of course, be used in connection with threaded and welded parts on devices other than fuel injection nozzles.

I claim:

1. A welded joint between partially telescoped inner and outer members, the outer member having an internal thread spaced from one end thereof and a bore between said end and said internal thread, the inner member toward one end thereof having an external thread engaged with the internal thread and having a transverse shoulder inwardly of the external thread, said bore having a diameter greater than the major diameter of the external thread, weld metal fused to said one end and said shoulder to form a leak proof welded joint therebetween, said inner member having a cylindrical portion within said bore and of larger diameter than the major diameter of said external thread, said inner member having an annular groove between said shoulder and said cylindrical portion and radially opposite at least a portion of said weld metal whereby in the event a radially inwardly projecting burr of smaller diameter than said cylindrical portion is produced by cutting through the welded joint, said cylindrical portion will engage the burr upon unthreading of the outer member from the inner member and expand the diameter of the burr so that it may pass over the external thread.

2. The joint of claim 1 in which the groove has an inclined face adjacent the cylindrical portion.

3. The joint of claim 1 in which the inner member has another cylindrical portion adjacent said shoulder for preventing radially inward movement of a portion of the weld metal.

4. The joint of claim 3 in which said another cylindrical portion is approximately the same diameter as the first mentioned cylindrical portion.

5. The joint of claim 1 in which said one end of the outer member is radially opposite said groove when the joint is being welded.

6. The joint of claim 1 in which said one end and said shoulder are spaced from each other prior to welding for receiving a ring of weld metal therebetween.

7. The joint of claim 1 in which said weld metal is initially in the form of a ring having a diameter greater than the diameter of said cylindrical portion and said external thread.

8. The joint of claim 3 in which the diameter of such another cylindrical portion is greater than the diameter of said first mentioned cylindrical portion.

* * * * *